(12) United States Patent
Fargo et al.

(10) Patent No.: US 6,540,060 B1
(45) Date of Patent: Apr. 1, 2003

(54) BELT DRIVE ASSEMBLY FOR A PASSENGER CONVEYOR

(75) Inventors: Richard Fargo, Plainville, CT (US); John P. Wesson, Vernon, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/021,280

(22) Filed: Oct. 30, 2001

(51) Int. Cl.[7] .............................................. B66B 21/00
(52) U.S. Cl. ..................... 198/330; 198/326; 198/833
(58) Field of Search ................. 198/330, 321, 198/326, 327, 833

(56) References Cited

U.S. PATENT DOCUMENTS

| | | | | |
|---|---|---|---|---|
| 308,867 A | * | 12/1884 | Ayres | 14/70 |
| 812,374 A | | 2/1906 | Smead | |
| 2,039,994 A | | 5/1936 | Herker | |
| 3,268,065 A | | 8/1966 | Thomson | |
| 3,365,051 A | | 1/1968 | Mullis et al. | |
| 3,366,217 A | * | 1/1968 | Tosato et al. | 198/833 |
| 3,414,108 A | * | 12/1968 | Jackson et al. | 198/321 |
| 3,677,388 A | | 7/1972 | Boltrek et al. | |
| 3,967,720 A | * | 7/1976 | Arieh | 198/833 |
| 4,058,204 A | * | 11/1977 | Arieh | 198/833 |
| 4,082,173 A | * | 4/1978 | Simon-Kochloffel | 198/330 |
| 4,397,096 A | | 8/1983 | Kraft et al. | |
| 4,535,880 A | | 8/1985 | Boltrek | |
| 4,636,181 A | | 1/1987 | Savolainen et al. | |
| 4,895,240 A | * | 1/1990 | Bruehl et al. | 198/331 |
| 5,115,899 A | * | 5/1992 | Nakatani | 198/334 |
| 5,307,920 A | * | 5/1994 | Meyer et al. | 198/335 |
| 5,308,725 A | * | 5/1994 | Yu et al. | 430/56 |
| 5,755,315 A | * | 5/1998 | Wallbaum et al. | 198/331 |
| 5,881,859 A | * | 3/1999 | Bianchi | 198/335 |
| 6,457,573 B1 | * | 10/2002 | Ostermeier et al. | 198/330 |

FOREIGN PATENT DOCUMENTS

| | | |
|---|---|---|
| DE | 22 52 763 | 5/1974 |
| DE | 25 26 552 | 1/1976 |
| GB | 272016 | 6/1927 |

* cited by examiner

Primary Examiner—Christopher P. Ellis
Assistant Examiner—Richard Ridley
(74) Attorney, Agent, or Firm—Carlson, Gaskey & Olds

(57) ABSTRACT

A passenger conveyor drive belt assembly includes a belt support that facilitates proper engagement between the drive belt and corresponding links of a step chain. The belt support preferably is positioned between a drive sheave and an idle sheave within the loop traveled by the drive belt. The belt support includes at least one moveable support member that moves responsive to movement of the drive belt while urging the drive belt into proper engagement with the step chain links.

12 Claims, 6 Drawing Sheets

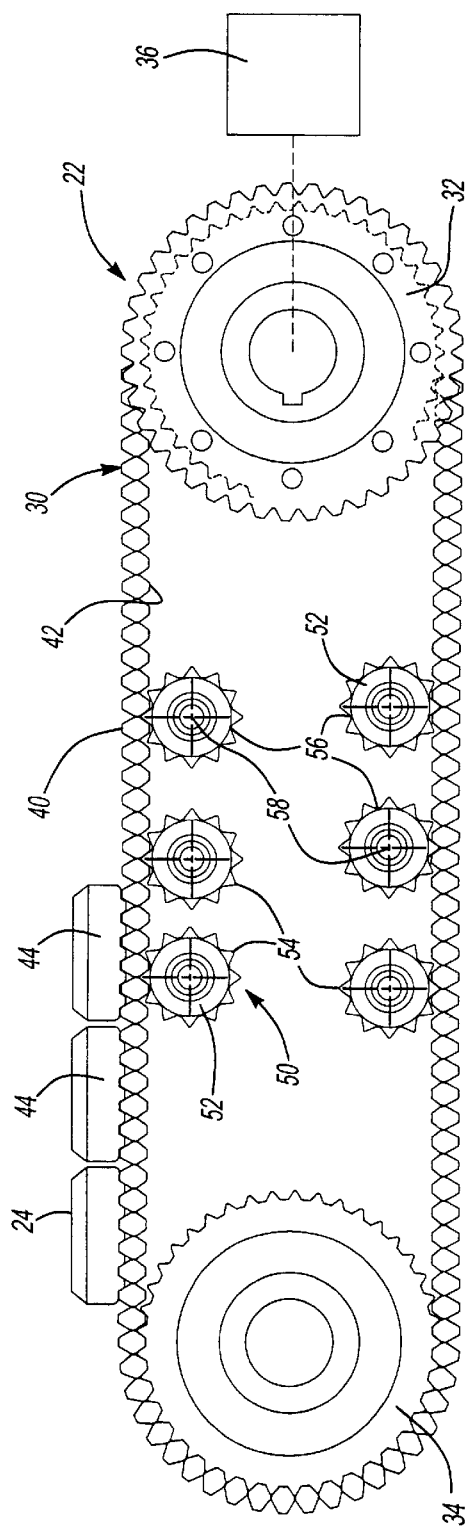
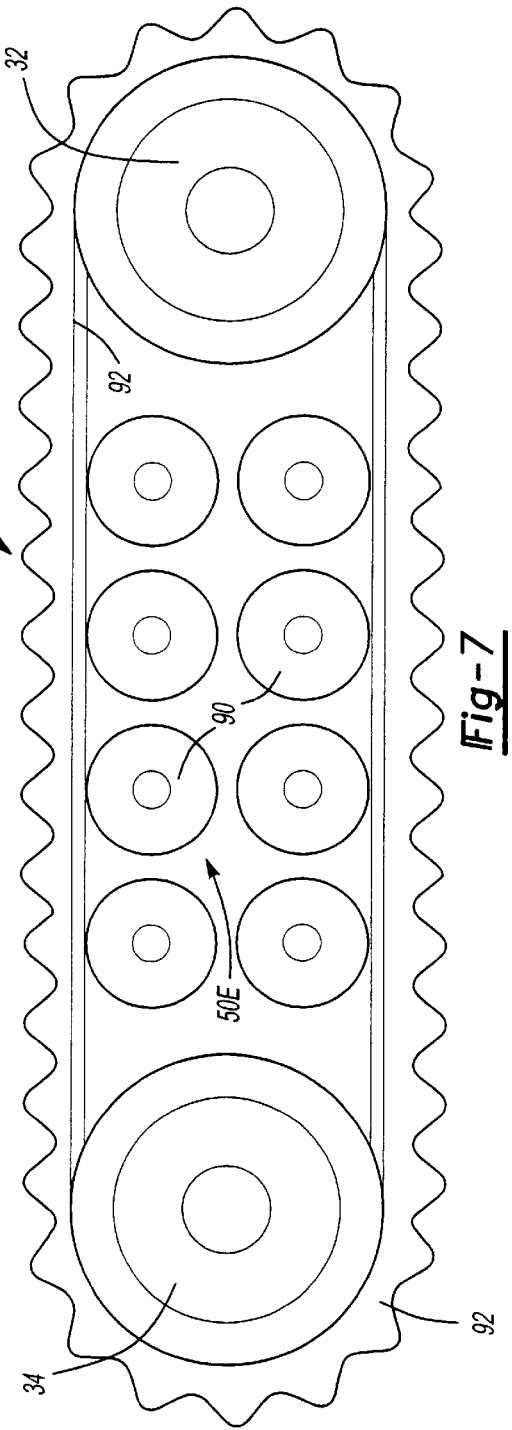

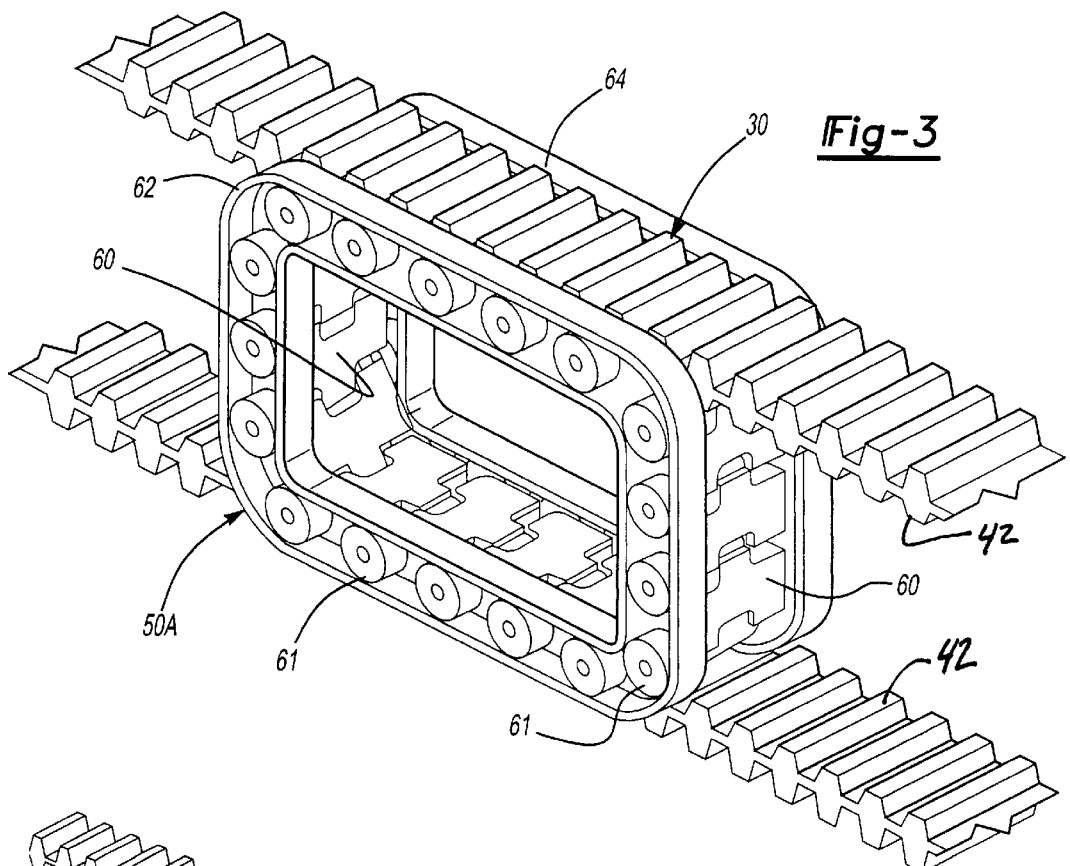
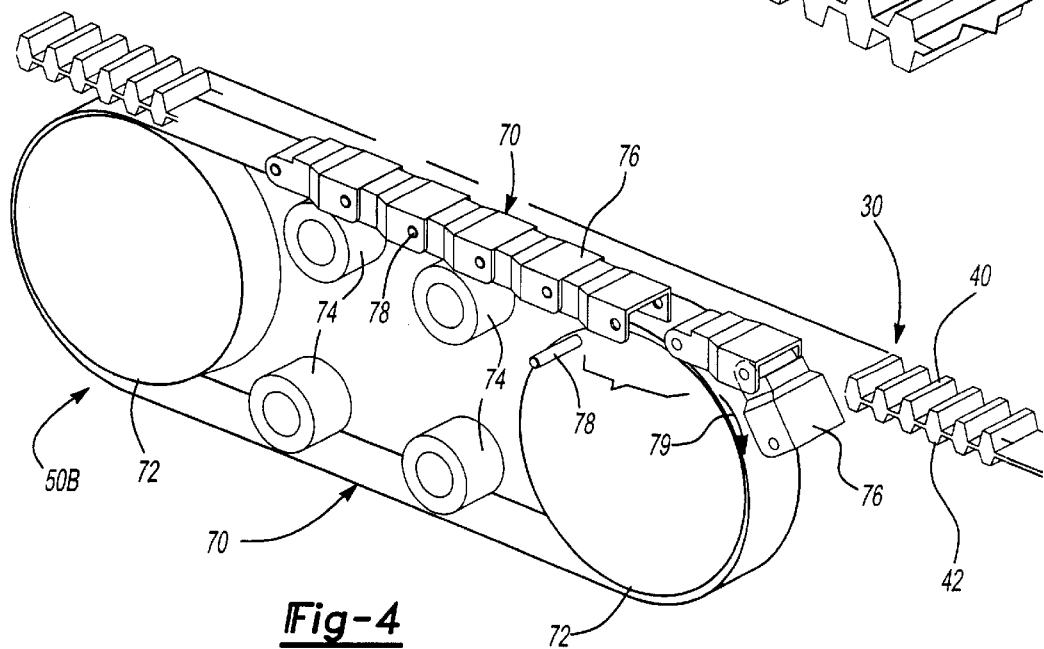

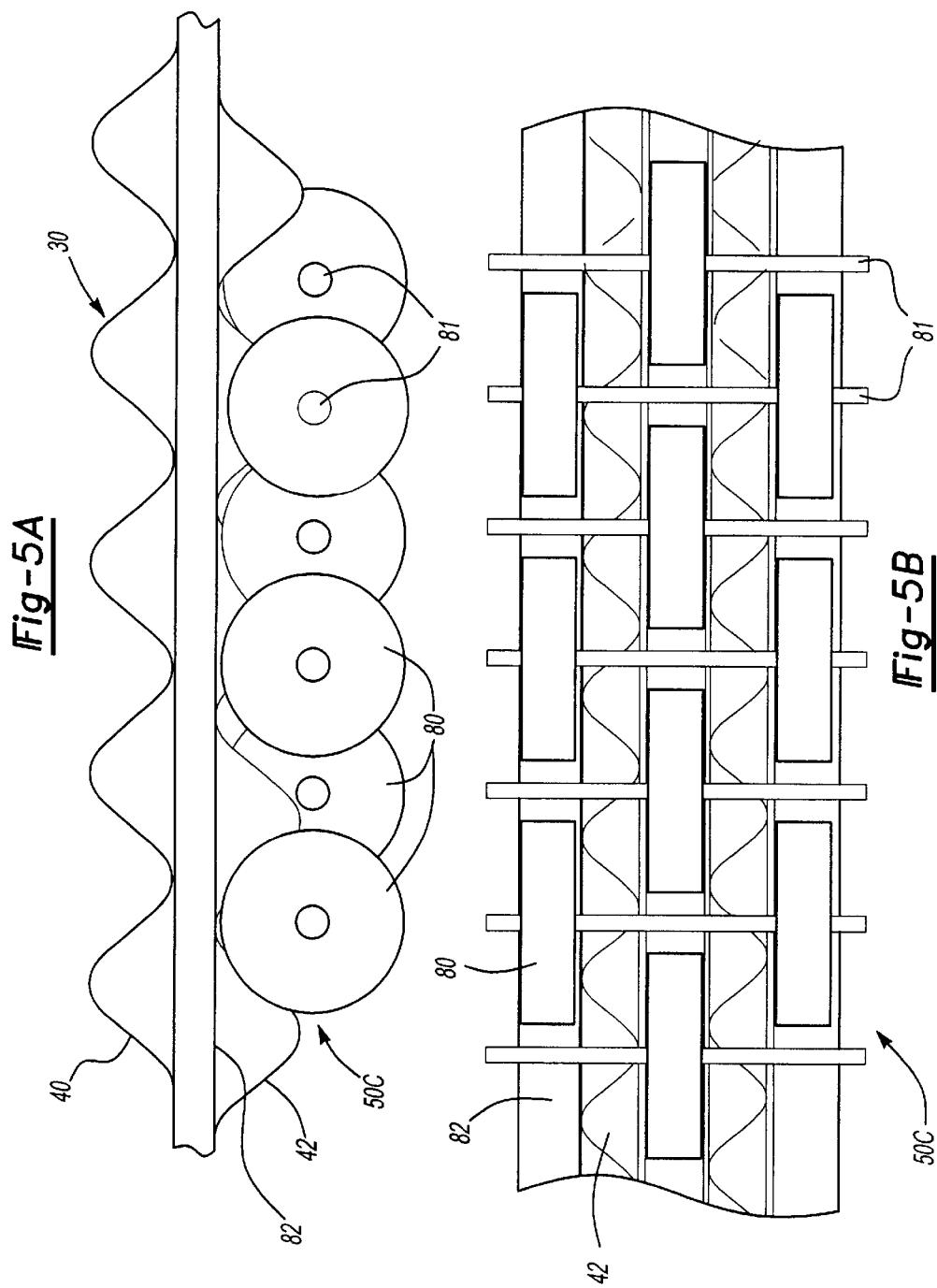

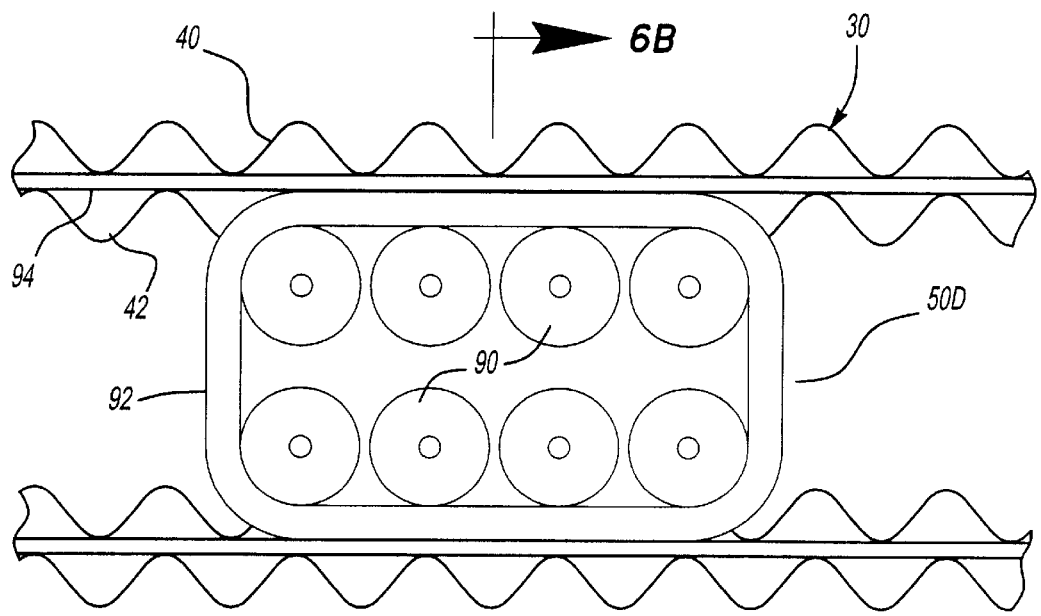
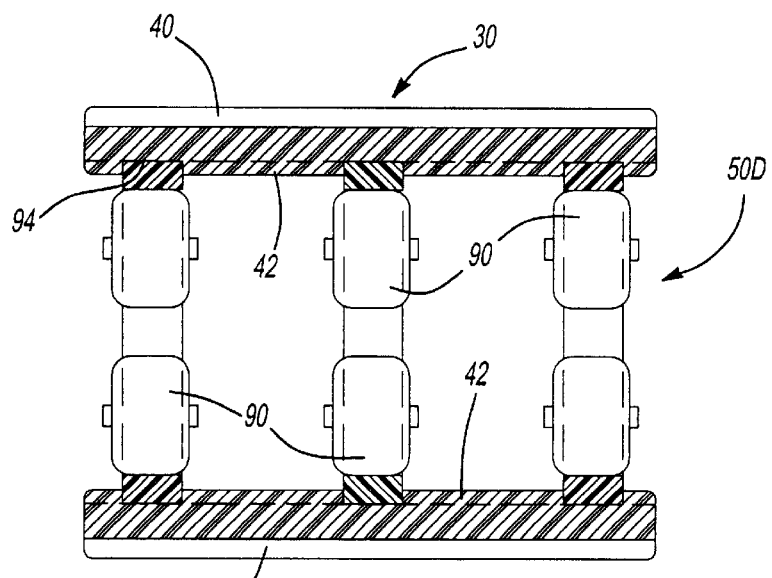

BELT DRIVE ASSEMBLY FOR A PASSENGER CONVEYOR

BACKGROUND OF THE INVENTION

This invention generally relates to passenger conveyor drive systems. More particularly, this invention relates to a drive belt assembly for a passenger conveyor.

Passenger conveyors such as escalators or moving walkways typically include a plurality of steps or pallets that move in a loop pattern. A drive assembly for moving the steps typically is supported within a building structure underneath the corresponding floor also enclosed so that it is hidden from view. Over the years, there has been a desire to move away from overly complicated and large machinery. Those skilled in the art have strived to improve passenger conveyor drive systems to make them easier to incorporate into building structures and more economical, for example.

One difficulty associated with many escalator drive systems is the need for frequent maintenance or repair. Not only does this introduce costs for maintaining escalator systems, but it also presents a difficulty to maintenance technicians. The need to hide escalator drive components underneath floors or within other structures of a building necessarily places constraints on the ability to readily access components for repair or replacement.

There is a need for an improved escalator drive system. There are a variety of challenges and obstacles to be overcome in successfully designing such a drive system. This invention provides a unique belt drive arrangement that has a support assembly for ensuring satisfactory performance of the overall drive system.

SUMMARY OF THE INVENTION

In general terms, this invention is an assembly for driving a passenger conveyor system. A drive assembly designed according to this invention includes a drive belt that has a cogged surface that is adapted to engage correspondingly configured links of a step chain associated with a plurality of steps. The drive belt forms a loop. A drive sheave is positioned at one end of the loop and engages an inner surface of the drive belt to move the belt around the loop. An idle sheave is positioned at an opposite end of the loop and engages the inner surface of the drive belt. The idle sheave moves with the belt responsive to movement of the drive sheave. A belt support is positioned between the drive sheave and the idle sheave. The belt support has at least one moveable element engaging the inner surface of the belt and maintaining a desired position of the belt near the belt support to insure a desired engagement between the cogged surface of the drive belt and the links of the step chain near the belt support.

The various features and advantages of this invention will become apparent to those skilled in the art from the following detailed description of the currently preferred embodiments. The drawings that accompany the detailed description can be briefly described as follows.

BRIEF DESCRIPTION OF THE DRAWINGS

FIG. 2 schematically illustrates selected portions of a preferred embodiment of a drive assembly designed according to this invention.

FIG. 3 illustrates selected portions of another example drive assembly designed according to this invention.

FIG. 4 illustrates selected portions of another example drive assembly designed according to this invention.

FIGS. 5A and 5B illustrate selected portions of a belt support arrangement of another example drive assembly designed according to this invention.

FIGS. 6A and 6B illustrate a modified version of the example embodiment of FIGS. 5A and 5B.

FIG. 7 illustrates selected portions of another modification of the embodiment of FIGS. 5A and 5B.

DETAILED DESCRIPTION OF THE PREFERRED EMBODIMENTS

Figure 1:
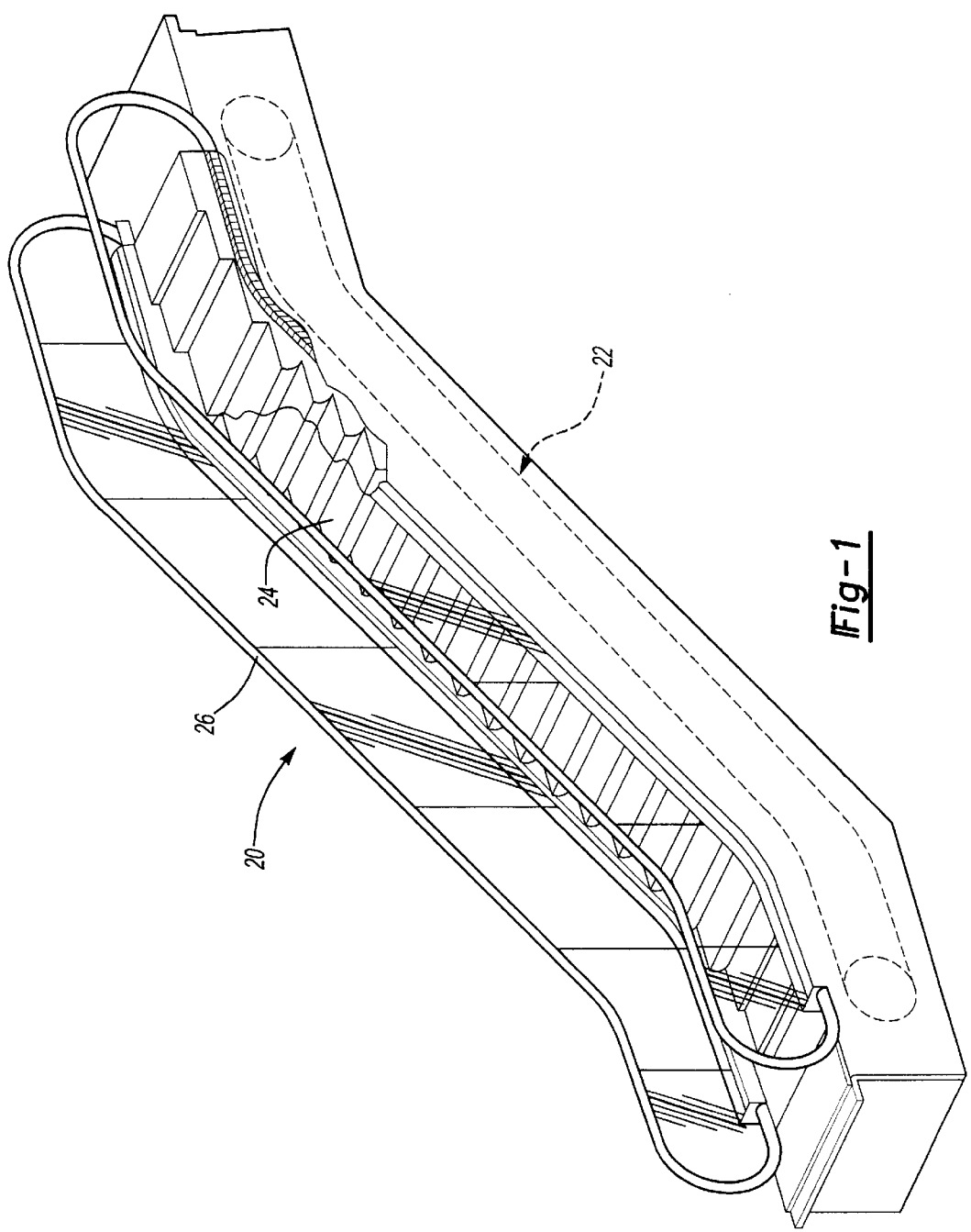
FIG. 1 diagrammatically illustrates an escalator system.

A passenger conveyor system 20 includes a drive assembly 22 for moving a plurality of steps 24 in a desired direction. A handrail 26 moves with the steps 24 in a conventional manner. An escalator is illustrated in FIG. 1 as an example passenger conveyor. This invention is equally applicable to moving walkways or other passenger conveyors.

A drive assembly 22 designed according to this invention includes a drive belt 30. A drive sheave 32 preferably engages an inner side of the drive belt 30 to move the belt 30 around a loop. An idle sheave 34 preferably is positioned at an opposite end of the loop from the drive sheave 32. A drive mechanism 36 is schematically shown for moving the drive sheave 32 in the desired direction and at the desired speed. The drive mechanism 36 may include a braking mechanism as known in the art, for example.

The belt 30 preferably includes reinforcing members such as steel cords or polymer strands encased in a polymer material. An outer surface 40 on the drive belt 30 preferably is cogged while an inner surface 42 preferably is also cogged. The inner surface is shaped to interface with the drive sheave 32. The cogged surfaces are also referred to as having teeth in this description. The outer surface 40 preferably cooperates with a plurality of step chain links 44, which are associated with the steps 24 in a known manner. The cogged pattern on the outer surface 40 preferably corresponds to the pattern of teeth on the step chain links 44. As the drive sheave 32 moves the belt 30, engagement between the cogged surface 40 and the step chain links 44 results in the desired movement of the steps 24.

A belt support 50 preferably is positioned between the drive sheave 32 and the idle sheave 34. The belt support 50 avoids any sagging of the belt in a central portion of the loop where the drive belt 30 may otherwise become disengaged from the step chain links 44. In the example of FIG. 2, the belt support 50 includes a plurality of rollers 52 that engage the inner surface 42 on the belt 30. Each of the rollers 52 preferably includes an outer surface having a plurality of spaced spines 54 and grooves 56. The configuration of the outer surface on the rollers 52 preferably complements the configuration of the inner surface 42 on the belt 30, which permits the rollers 52 to support the belt 30 between the teeth. The rollers 52 preferably extend axially across the width of the belt 30 and freely rotate about their respective axes 58.

The belt support 50 preferably is supported on an escalator truss structure. It is also possible to arrange the belt support 50 to be supported by the building structure, which may be particularly useful for moving walkways. In one example the rollers 52 are supported on fixed axles that extend between parallel plates, which are securely positioned to maintain desired roller positions. Given this description, those skilled in the art will be able to realize appropriate support structures for maintaining the belt support 50 in a preferred location so that it operates as needed for a particular situation.

The rollers 52 preferably are positioned to cause the belt 30 to have a desired amount of engagement with the step chain links 44 in the vicinity of the support 50. To get maximum support, the rollers preferably are as small as practical given the belt tooth pitch. The space between the sheaves and between the top and bottom of the belt loop impacts how many rollers will provide the desired support. Given this description, those skilled in the art will be able to determine the proper number of rollers needed and their optimum placement to meet the needs of a particular situation. The rollers 52 preferably are positioned to insure proper engagement between the belt 30 and the step chain links 44 without interfering with such engagement or introducing undesirable wear or temperature increases on the belt 30.

A belt support 50 designed according to this invention preferably distributes the load across the teeth on the cogged surface 40 of the belt as evenly as possible over a plurality of the teeth. In one example, the load is distributed across approximately twelve teeth. A belt support 50 designed according to this invention also eliminates the need for any special tooth configurations that otherwise might be necessary to avoid clash at the engagement between the teeth on the belt and the corresponding surfaces on the step chain links. With a belt support designed according to this invention, the teeth on the belt 30 may include nearly vertical faces, which requires minimal engagement force and renders the overall drive system more efficient.

A belt support designed according to this invention therefore provides for a more evenly distributed load over the belt surface along the entire loop, which improves the belt life and the performance of the drive system.

FIG. 3 illustrates another example belt support 50A. This example includes a support chain 60 that engages the inner surface 42 on the drive belt 30. The links of the chain 60 have associated rollers 61 that follow tracks 62 and 64. The rollers 61 follow a loop that is smaller than the loop of the drive belt 30. Along a portion of the loop formed by the tracks 62 and 64 (i.e., the top and bottom portions according to the illustration) the support chain 60 ensures that the drive belt 30 is in a position to properly engage the step chain links 44. In one example, the support chain 60 includes a generally flat surface that is received against the inner surface 42 on the drive belt 30. In another example, the support chain includes a cogged surface that corresponds to and engages the cogged inner surface 42 of the belt so that the chain moves about its own loop as the drive belt 30 moves above its loop. Those skilled in the art who have the benefit of this description will be able to select an appropriate loop size and an appropriate support chain design to meet the needs of their particular situation.

FIG. 4 shows another example belt support 50B. Only portions of selected components are shown diagrammatically for simplicity. In this example, a support chain 70 follows a loop that is smaller than the loop of the drive belt 30. In this example, the support chain 70 is held in a desired position by rollers 72 and 74. The rollers preferably are positioned to force the chain 70 into contact with the drive belt 30 along a portion of the length of the loop of the chain 70 as desired.

The support chain 70 preferably is designed to pivot in one direction but not in an opposite direction. Each link 76 preferably is constructed so that an adjacent link pivots about an axis 78 in only one direction preferably up to an angle of approximately 90 degrees. This is schematically illustrated by the direction arrow 79, which shows the permissible movement between adjacent links. The structure of each link prevents any pivoting in an opposite direction.

Of course, there is some limitation on the ability to construct the links to prevent all pivoting in the one direction. In one example, the chain preferably is designed so that any deflection of the chain in the direction opposite to the pivot direction corresponds to an arc having an eight meter radius. Such an arrangement accommodates the physical limitations on designing a chain to prevent pivoting in one direction while maintaining the desired amount of contact between the drive belt 30 and the step chain links 44 along a given portion of the drive belt loop.

In the examples of FIGS. 3 and 4 the support chain provides the advantage of distributing the load for urging the drive belt into engagement with the step chain links over a chosen length of the belt rather than causing point contact. The loop of the support chain preferably is arranged so that the chain does not cause engagement between the belt and step chain links at the locations where the support chain turns about a radius of the support rollers or pulleys. This eliminates clash issues between the belt 30 and teeth on the links 44. Additionally, these arrangements allow the belt deflection angle to be limited to approximately one degree. This limits the force on the engagement system, produced by the belt tension, to around 300 N, even when the tension on the belt is approximately 10,000 N.

In the region where the drive belt 30 is effectively squeezed between the support chain and the links 44, the center teeth of the belt surface 40 are fully engaged whereas the teeth near the end of the engagement area (i.e., at the sides of the support) are disengaged by up to approximately one millimeter.

The tracks or rollers that guide the support chain preferably are designed to allow for some oscillatory motion at the turning points to allow for the polygon effect of the support chain links when moving around a loop.

FIGS. 5A and 5B illustrate another example belt support 50C designed according to this invention. In this example, a plurality of rollers 80 are spaced about the undersurface 42 of the belt 30. The rollers 80 are supported on a plurality of axes 81 that are appropriately supported by an escalator truss structure. The belt 30 preferably is machined so that the undersurface 42 includes a plurality of flat portions 82 along which the rollers 80 contact the belt 30. In the illustrated example, a plurality of rollers 80 preferably are spaced apart axially and in a transverse direction so that the rollers 80 are staggered to more evenly distribute the load across the surface of the belt in the area of the support 50C. Those skilled in the art who have the benefit of this description will be able to chose the number of rollers used and the spacing needed to meet the needs of their particular situation.

FIGS. 6A and 6B illustrate a modification to the embodiment of FIGS. 5A and 5B. In this example, a belt support 50D includes a plurality of sets of rollers 90 that are spaced laterally in similar fashion to the rollers 80 of the previous example. In this example, a plurality of support belts 92 are received about the sets of rollers 90. Each support belt 92 is received about a row of rollers 90 as seen in the direction of belt travel. The support belts 92 may be made from a polymer material. The support belts 92 preferably engage flat portions 94 that are machined on the inner side 42 of the belt 30. In this example, the support belts 92 better distribute the load on the belt 30 compared to rollers that directly contact the drive belt 30.

The example of FIG. 7 includes a belt support 50E that includes support belts 92 that travel along a loop that is approximately the same size of the loop of the drive belt 30. In this example, a plurality of support belts 92 engage a plurality of flat portions machined on the inner side of the belt 42 like that shown for the previous example. The support belts 92 preferably travel about the drive sheave 32 and the idle sheave 34. The surfaces of the sheaves preferably are machined to accommodate the support belts 92 along with the drive belt 30. In one example, the sheave surfaces are machined to include flats corresponding to the positions of the support belts 92. Between the sheaves 32 and 34 the support belts 92 are supported by rollers 90 to maintain a desired amount of contact between the support belts 92 and the drive belt 30 along the entire loop.

Figure 8:
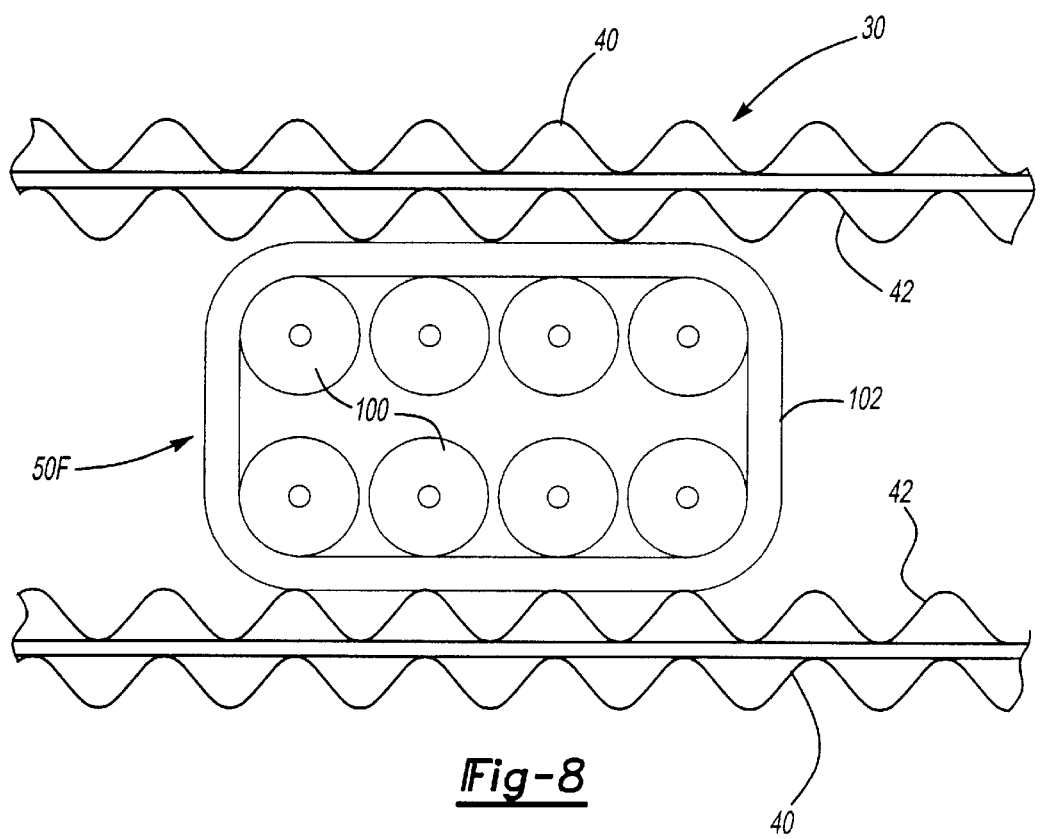
FIG. 8 schematically illustrates another example assembly designed according to an embodiment of this invention.

The example of FIG. 8 illustrates a belt support 50F having a plurality of rollers 100. A support belt 102 travels about a loop around the rollers 100 and engages the inner surface 42 of the drive belt 30. In this example, there are no machined flat portions upon which the support belt rides. Instead, the support belt 102 directly engages the outermost portion of the cogs on the inner surface 42 of the belt 30. The rollers 100 and support belts 102 preferably are arranged like the alignment shown in FIGS. 6A and 6B (with the exception of flats on the belt 30).

The preceding description is exemplary rather than limiting in nature. Variations and modifications to the disclosed examples may become apparent to those skilled in the art that do not depart from the essence of this invention. The scope of legal protection given to this invention can only be determined by studying the following claims.

We claim:

1. An assembly for driving a passenger conveyor system, comprising:
   a drive belt that has a cogged surface that is adapted to engage correspondingly configured links of a step chain associated with a plurality of steps, the drive belt forming a loop;
   a drive sheave engaging an inner surface of the drive belt to move the belt around the loop;
   a second sheave spaced from the drive sheave and engaging the inner surface of the drive belt, the second sheave moving with the belt responsive to movement of the drive sheave; and
   a belt support positioned between the drive sheave and the second sheave, the belt support having at least one movable support member engaging the inner surface of the belt and maintaining a desired position of the belt in a region near the belt support to ensure a desired engagement between the cogged surface and the links near the belt support.

2. The assembly of claim 1, wherein the belt support includes a plurality of rollers each having an outer surface that engages the inner surface of the belt, some of the rollers engaging a first portion of the inner surface of the belt and others of the rollers engaging a second, oppositely facing portion of the inner surface of the belt.

3. The assembly of claim 2, wherein the inner surface of the belt is cogged and the rollers include an exterior surface that complements and engages the inner surface of the belt.

4. The assembly of claim 3, wherein the rollers have an axial length that is approximately equal to a width of the belt.

5. The assembly of claim 2, wherein the rollers have an axial length that is less than a width of the belt and there are a plurality of rows of the rollers across the width of the belt.

6. The assembly of claim 1, wherein the belt support includes rollers and the moveable support member comprises a support belt that engages the inner side of the drive belt, the support belt being supported on the rollers and forming a loop that is smaller than the drive belt loop.

7. The assembly of claim 1, wherein the belt support includes rollers and the moveable support member comprises a support belt that engages the inner side of the drive belt, the support belt being supported on the rollers, the drive sheave and the idle sheave and forming a loop that is approximately equal to the size of the drive belt loop.

8. The assembly of claim 1, wherein the inner surface of the drive belt is cogged and has a plurality of generally flat tracks extending along the loop on the inner belt surface and the moveable support member engages the flat tracks.

9. The assembly of claim 1, wherein the belt support includes a support chain that contacts the inner surface of the belt, the support chain forming a loop that is smaller than the belt loop, the belt support including a track that supports rollers associated with the support chain, the rollers following the track as the support chain moves with movement of the drive belt.

10. The assembly of claim 9, wherein the track and the support chain maintain the drive belt in a generally straight line along at least a portion of a length of the drive belt loop that is in contact with the support chain.

11. The assembly of claim 1, wherein the belt support includes a support chain having a plurality of links interconnected to form a loop that is smaller than the loop of the drive belt, the support chain links being capable of pivoting relative to each other in only one direction.

12. The assembly of claim 11, including a plurality of force rollers supported to engage an inner surface on the support chain to guide the support chain around the smaller loop and to maintain a desired contact between the support chain and the drive belt.

* * * * *